United States Patent
Huang et al.

(10) Patent No.: US 7,229,214 B2
(45) Date of Patent: Jun. 12, 2007

(54) FLUID DYNAMIC BEARING UNIT

(75) Inventors: Ching-Hsing Huang, Tu-Cheng (TW);
Wun-Chang Shih, Tu-Cheng (TW);
Hsien-Sheng Pei, Tu-Cheng (TW)

(73) Assignee: Hon Hai Precision Industry Co., Ltd.,
Tu-Cheng, Taipei Hsien (TW)

( * ) Notice: Subject to any disclaimer, the term of this patent is extended or adjusted under 35 U.S.C. 154(b) by 105 days.

(21) Appl. No.: 11/012,419

(22) Filed: Dec. 14, 2004

(65) Prior Publication Data

US 2006/0039633 A1 Feb. 23, 2006

(30) Foreign Application Priority Data

Aug. 17, 2004 (CN) .......................... 2004 1 0051186

(51) Int. Cl.
*F16C 17/02* (2006.01)
(52) U.S. Cl. ........................ 384/115; 384/114; 384/119; 384/292

(58) Field of Classification Search ................ 384/114, 384/115, 119, 120, 113, 292
See application file for complete search history.

(56) References Cited

U.S. PATENT DOCUMENTS 6,236,129 B1  5/2001  Yamashita
7,056,026 B2*  6/2006  Grantz et al. ................ 384/119

* cited by examiner

*Primary Examiner*—Lenard A. Footland
(74) *Attorney, Agent, or Firm*—Morris Manning & Martin LLP; Tim Tingkang Xia, Esq.

(57) ABSTRACT

A fluid dynamic bearing unit includes a bearing housing (20) axially defining therein a bearing hole (21), a rotary shaft rotatably received in the bearing hole with a radial space formed between the rotary shaft and the bearing housing, and lubricant filled in the radial space. A ventilating path (25) is formed in a wall of the bearing housing to communicate a bottom of the bearing hole with an exterior of the bearing housing.

8 Claims, 2 Drawing Sheets

US 7,229,214 B2

FLUID DYNAMIC BEARING UNIT

CROSS-REFERENCE TO RELATED APPLICATIONS

This application is related to a co-pending U.S. patent application Ser. No. 11/012,420, entitled "FLUID DYNAMIC BEARING", filed with the same assignee as the instant application on Dec. 14, 2004. The disclosure of the above identified application is incorporated herein by reference.

TECHNICAL FIELD

The present invention relates generally to bearings, and more particularly to a fluid dynamic bearing.

BACKGROUND

Due to request for low abrasion on rotational elements to achieve an extended life and for low extent of noise, fluid dynamic bearings (FDB) have been used in conventional fan motors.

FIG. 4 depicts an FDB unit in which a shaft 80 extends through a bearing sleeve 81 with a clearance space formed therebetween. The clearance space is filled with lubricant oil that provides a medium through which a dynamic fluid pressure field may be generated. Relative rotation between the bearing sleeve 81 and the shaft 80 is required to set up the dynamic fluid pressure field. The bearing sleeve 81 supports radial load by metal-to-metal contact when there is no relative motion. During normal operation, the spinning of the shaft 80 sets up a steady pressure field around the clearance space that pushes the shaft 80 and the bearing sleeve 81 apart and thus prevents metal-to-metal contact. To obtain an improved dynamic pressure field, grooves 82 are formed on the inner surface of the bearing sleeve 81.

The bearing sleeve 81 is disposed in a housing 83. A ventilating passage 85 is formed between the outer periphery of the bearing sleeve 81 and an inner surface of the housing 83. The ventilating passage 85 has a vertical section and a horizontal section. This ventilating passage 85 allows air to escape the bearing sleeve 81 when the shaft 80 enters the bearing sleeve 81. However, the fluid dynamic bearing system is cooperatively formed by two components, i.e., the housing 83 and the bearing sleeve 81. To ensure the dynamic fluid pressure, the two components must be precisely produced and then assembled together. This structure is complicated and necessitates a high manufacturing cost.

For the foregoing reasons, there is a need for a fluid bearing having a simple structure with low cost.

SUMMARY OF THE INVENTION

The present invention is directed to a fluid dynamic bearing unit which has a simple structure with low cost.

A fluid dynamic bearing unit according to the present invention comprises a bearing housing axially defining therein a bearing hole, a rotary shaft rotatably received in the bearing hole with a radial space formed between the rotary shaft and the bearing housing, and lubricant filled in the radial space. A ventilating path is formed in a wall of the bearing housing to communicate a bottom of the bearing hole with an exterior of the bearing housing.

Other objects, advantages and novel features of the present invention will be drawn from the following detailed description of the preferred embodiments of the present invention with attached drawings, in which:

DESCRIPTION OF PREFERRED EMBODIMENTS

Figure 1:
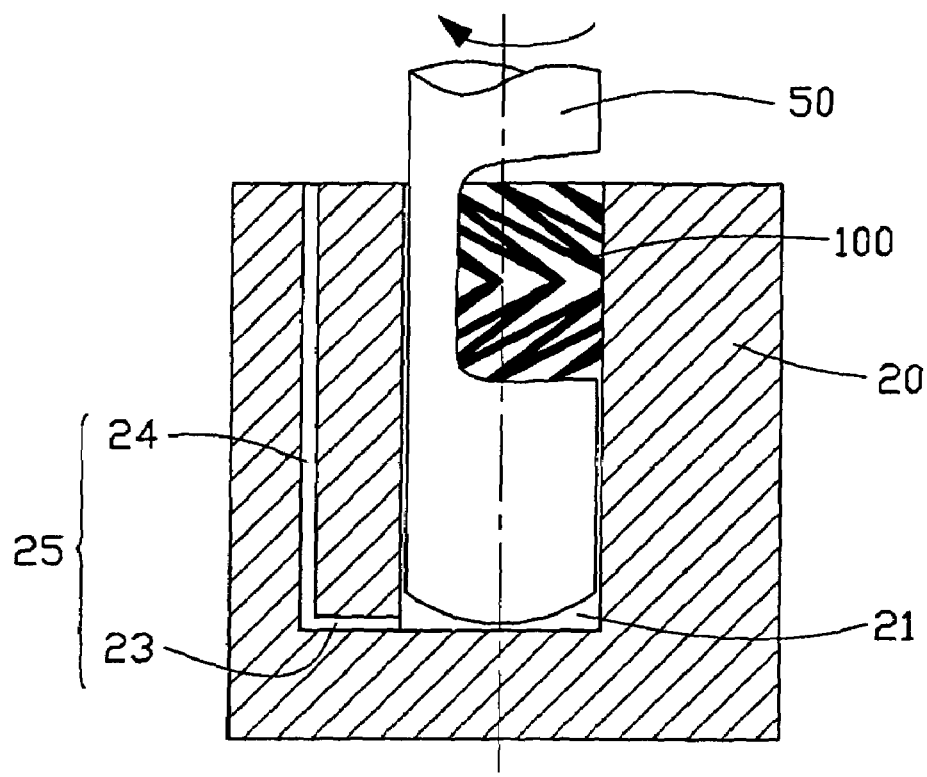
FIG. 1 is a cross sectional view of a fluid dynamic bearing unit according to a preferred embodiment of the present invention.
Figure 2:
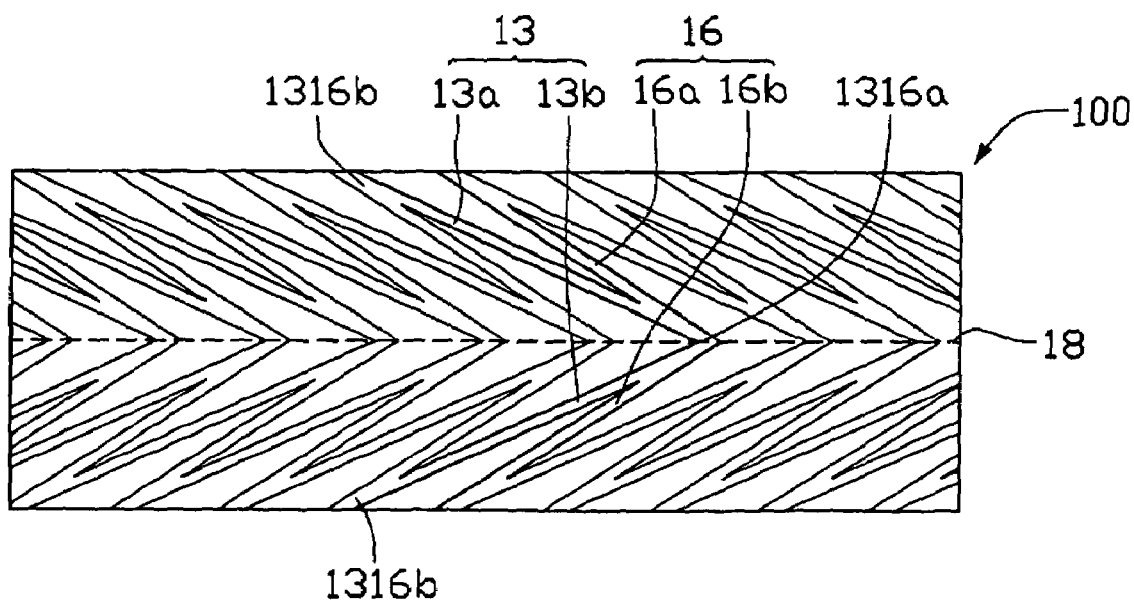
FIG. 2 is an enlarged, unfurled view of the bearing pattern of the bearing housing of FIG. 1.

FIG. 1 shows by way of example a preferred embodiment of a fluid dynamic bearing unit (hereinafter referred to as "bearing unit"). This bearing unit is used, for example, in connection with a hard disk drive motor, a fan motor and a scanner motor or the like. The bearing unit comprises a bearing housing 20, and a rotary shaft 50 rotatably received in the bearing housing 20 with a radial space formed between the bearing housing and the rotary shaft. Lubricant is filled in the radial space to establish dynamic pressure to separate the shaft and the bearing housing in radial direction when the rotary shaft rotates.

The bearing housing 20 has a generally U-shaped cross section. A bearing hole 21 is defined in the bearing housing 20 for receiving the rotary shaft 68 therein. The bearing hole 21 is a blind hole so that the bearing hole 21 does not extend through the bearing housing 20. Thus, the bearing housing 20 is open at the topside thereof while closed at the bottom side thereof.

A ventilating path 25 is formed in the wall of the bearing housing 20. The ventilating path 25 communicates a bottom of the bearing hole 21 with an exterior of the bearing housing 20. The ventilating path 25 includes a first section 23 horizontally and radially defined in the wall of the bearing housing 20 and a second section 24 axially defined in the wall to communicate the first section 23 with an exterior of the bearing housing 20 at a top face thereof. When the rotary shaft 50 extends into the bearing housing 20, air in the bearing hole 21 is able to escape along the first section 23 and then the second section 24 to the exterior of the bearing housing 20.

A cylindrical bearing pattern 100 is formed on an inner cylindrical surface of the bearing housing 20. Alternatively, the bearing pattern 100 is formed on the outer surface of the rotary shaft 50. When the rotary shaft 50 rotates at a high speed in the bearing housing 20, the lubricating oil in the bearing pattern 100 establishes dynamic pressures against the rotary shaft 50 so that the rotary shaft 68 does not physically contact the inner cylindrical surface of the bearing housing 20 during rotation thereof.

Figure 3:
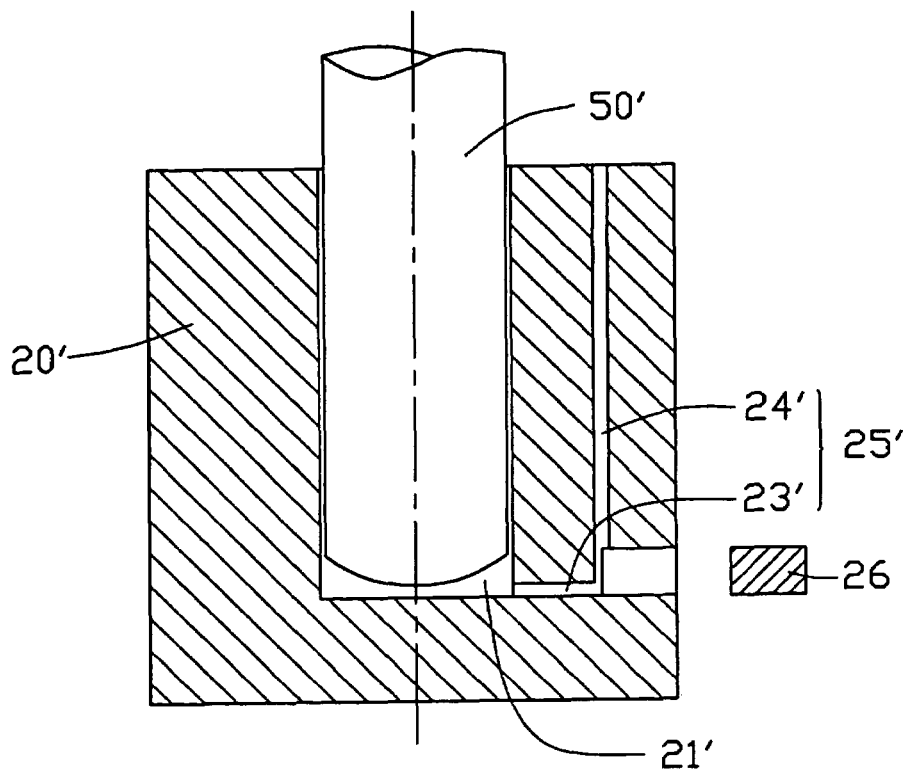
FIG. 3 is a cross sectional view of a fluid dynamic bearing unit according to an alternative embodiment of the present invention.

Referring to FIG. 3, the cylindrical bearing pattern 100 is unfurled to a flat diagram for the sake of clarity. The bearing pattern 100 comprises an upper half and a lower half bounded by a centerline 18. A plurality of V-shaped first grooves 13 and second grooves 16 is arranged circumferentially in an alternate fashion along extension of the bearing pattern 100. Each first groove 13 has first and second branches 13a, 13b formed at the upper and lower halves of the bearing pattern 100 respectively. Each second groove 16 has first and second branches 16a, 16b formed at the upper and lower halves of the bearing pattern 100 respectively. The first and second branches 13a, 13b of each first groove 13 and the first and second branches 16a, 16b of an neighboring second groove 16 converge at a center area of the bearing pattern 100 to form an inner communication end 1316a thereat. The first and second branches 13a, 13b of each first groove 13 communicate with the first and second branches 16a, 16b of another neighboring second groove 16 at the top and bottom edges of the bearing pattern 100 to form two outer communication ends 1316b thereat respectively.

In the upper half of the bearing pattern 100, every three adjacent first branches, i.e., two first branches 13a of the first grooves 13 plus one intermediate first branch 16a of the second groove 16, or two first branches 16a of the second grooves 16 plus one intermediate first branch 13a of the first groove 13, constitute a Z-shaped groove. In the lower half of the bearing pattern 100, every three adjacent second branches, i.e., two second branches 13b of the first grooves 13 plus one intermediate first branch 16b of the second groove 16, or two second branches 16b of the second grooves 16 plus one intermediate second branch 13b of the first groove 13, constitute a Z-shaped groove. Two groups of continuous Z-shaped grooves are thereby symmetrically formed respectively at upper and lower halves of the bearing pattern 100. The two groups of Z-shaped grooves intersect at the centerline 18 of the bearing pattern 100. By this arrangement, every two adjacent grooves of the bearing pattern 100, i.e., one first groove 13 and one neighboring second groove 16, are in communication with each other, either at the inner communication ends 1316a or at the outer communication ends 1316b.

When the rotary shaft 50 rotates, the lubricating oil at the outer communication ends 1316b is driven to the inner communication ends 1316a of the first and second grooves 13, 16 under a centrifugal pumping force caused by rotation of the shaft 50. A large amount of lubricating oil at the inner communication ends 1316a then establishes high fluid pressures to separate the rotary shaft 50 and the bearing housing 20 in radial direction.

Figure 4:
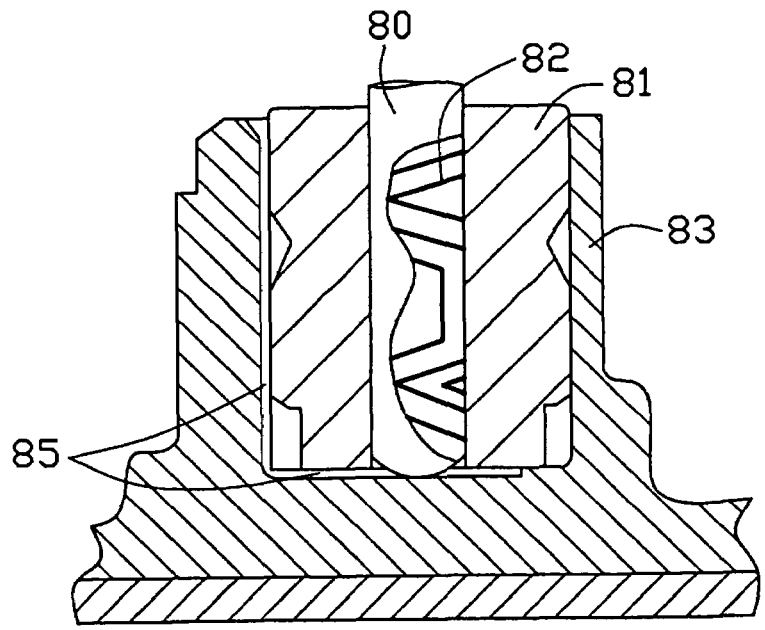
FIG. 4 is a cross sectional view of a conventional fluid dynamic bearing unit.

In the present invention, the ventilating path 25 is integrated with the bearing unit itself and is formed prior to attachment of the bearing unit to the housing 83 (FIG. 4). Therefore, making of the housing 83 and assembly of the bearing unit to the housing 83 can be done with relatively lower accuracy, which to some extent reduces the cost for producing the bearing unit and the motor using the bearing unit.

In addition, the first and second branches 13a, 13b of each first groove 13 and the first and second branches 16a, 16b of one neighboring second groove 16 converge at a center area of the bearing pattern 100 to form the inner communication end 1316a thereat, and the first and second branches 13a, 13b of each first grooves 13, 16 are in communication with the first and second branches 16a, 16b of one neighboring second groove 16 at the top and bottom edges of the bearing pattern 100 to form the outer communication ends 1316b thereat respectively. The lubricating oil at each outer communication end 1316b is thus driven to two corresponding inner communication ends 1316a along two separate paths, i.e., the first or second branches 13a, 16a or 13b, 16b of the adjacent first and second grooves 13, 16. Therefore, it is easy for more lubricating oil to move to the center area of the bearing pattern 100. In other words, the lubricating oil remaining at the outer communication end 1316b becomes less in comparison with the conventional fluid bearing in which only one lubricating oil flow path is arranged. As a result, the pressure generated by the lubricating oil at the top and bottom edges of the bearing pattern 100 becomes further lower than that of the conventional fluid bearing. Suppose the top edge of the bearing pattern 100 faces an outside of the bearing housing 20, this further lower pressure provides an enhanced capability to prevent leakage of lubricating oil at the top edge of the bearing pattern 100.

FIG. 3 illustrates a bearing unit according to an alternative embodiment of the present invention. A bearing housing 20' axially defines therein a blind bearing hole 21'. A rotary shaft 50' is rotatably received in the bearing hole 21'. A ventilating path 25' is formed in the wall of the bearing housing 20'. The ventilating path 25' includes a first section 23' radially defined through the wall of the bearing housing 20' and a second section 24' axially defined in the wall to communicate the first section 23' with an exterior of the bearing housing 20' at a top face thereof. The first section 23' has an inner end communicating with the bearing hole 21' at a bottommost portion thereof and an outer end communicating with an exterior of the bearing housing 20' at a circumferential periphery thereof. The first section 23' near the outer end thereof is enlarged in diameter. A plug 26 is mounted in the enlarged section to obstruct the first section 23' from continuingly communicating with the exterior of the bearing housing 20' via the outer end thereof and thus allow the first section 23' to only communicate with the exterior of the bearing housing 20' via the second section 24'. When the rotary shaft 50' extends into the bearing housing 20', air in the bearing hole 21' is able to escape along the first section 23' and then the second section 24' to the exterior of the bearing housing 20'.

It is understood that the invention may be embodied in other forms without departing from the spirit thereof. The above-described examples and embodiments are to be considered in all respects as illustrative and not restrictive, and the invention is not to be limited to the details given above.

What is claimed is:

1. A fluid dynamic bearing unit comprising:
a housing;
a bearing member fixedly mounted in the housing; and
a rotary shaft rotatably received in the bearing member with a radial space formed between the rotary shaft and the bearing member, the radial space filled with lubricant to establish dynamic pressure to separate the shaft and the bearing member in radial direction when the rotary shaft rotates; wherein
the bearing member defines therein a ventilating path to communicate an interior with an exterior of the bearing member and the ventilating path is formed prior to attachment of the bearing member in the housing;
wherein a bearing pattern is formed on either of the bearing member and the rotary shaft, and the bearing pattern comprises two groups of continuous Z-shaped grooves formed at upper and lower halves of the bearing pattern; and
wherein the Z-shaped grooves form a plurality of outer communication ends at top and bottom edges of the bearing pattern.

2. The fluid dynamic bearing unit as described in claim 1, wherein the bearing member defines a blind hole to receive the rotary shaft therein.

3. The fluid dynamic bearing unit as described in claim 2, wherein the bearing member comprises a generally U-shaped cross section.

4. The fluid dynamic bearing unit as described in claim 1, wherein the groups of Z-shaped grooves intersect with each other to form a plurality of inner communication ends at a center portion of the bearing pattern.

5. The fluid dynamic bearing unit as described in claim 1, wherein the ventilating path comprises a first section communicating with the interior of the bearing member and a second section communicating the first section with the exterior of the bearing member.

6. The fluid dynamic bearing unit as described in claim 5, wherein the first section is radially formed in the bearing member and the second section is axially formed in the bearing member.

7. The fluid dynamic bearing unit as described in claim 6, wherein the first section is defined through the wall of the bearing member, and a plug is disposed in an outer end of the first section so that the first section is prevented from continuingly communicating with the exterior of the bearing member via the outer end.

8. A fluid dynamic bearing unit comprising:
   a bearing defining a blind hole with a closed end and a ventilating path communicating the closed end of the hole with exterior of the bearing;
   a rotary shaft rotatably received in the hole;
   a bearing pattern being formed in at least one of said bearing and the shaft and comprising a plurality of first and second grooves arranged circumferentially in an alternate fashion, each of the first grooves being in communication with one neighboring second groove at an edge of the bearing pattern; and
   fluid received in the bearing pattern for applying pressure to the shaft when the shaft rotates in said hole;
   wherein each of the first grooves is V-shaped and has first and second branches, and each of the second grooves is V-shaped and has first and second branches, and the first and second branches of each of the first grooves communicate with the first and second branches of one neighboring second groove at top and bottom edges of the bearing pattern.

* * * * *